US006546546B1

(12) United States Patent
Van Doorn (10) Patent No.: US 6,546,546 B1
(45) Date of Patent: Apr. 8, 2003

(54) INTEGRATING OPERATING SYSTEMS AND RUN-TIME SYSTEMS

(75) Inventor: Leendert Peter Van Doorn, Valhalla, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/449,098

(22) Filed: Nov. 24, 1999

Related U.S. Application Data (60) Provisional application No. 60/134,900, filed on May 19, 1999, and provisional application No. 60/134,804, filed on May 19, 1999.

(51) Int. Cl.[7] .............................................. G06F 9/44
(52) U.S. Cl. ..................................................... 717/114
(58) Field of Search ......................... 717/114, 115–119; 713/152, 164, 200–202; 709/100, 172, 18 P, 225

(56) References Cited

U.S. PATENT DOCUMENTS

| | | | | |
|---|---|---|---|---|
| 6,003,134 A | * | 12/1999 | Kuo et al. ................... | 709/100 |
| 6,026,237 A | * | 2/2000 | Berry et al. ................. | 717/130 |
| 6,083,279 A | * | 7/2000 | Cuomo et al. ................ | 380/28 |
| 6,182,226 B1 | * | 1/2001 | Reid et al. ................... | 709/225 |
| 6,189,103 B1 | * | 2/2001 | Nevarez et al. ............. | 713/201 |
| 6,282,652 B1 | * | 8/2001 | Scheifler .................... | 713/200 |
| 6,295,607 B1 | * | 9/2001 | Johnson ...................... | 709/229 |
| 6,308,317 B1 | * | 10/2001 | Wilkinson et al. .......... | 717/139 |
| 6,330,677 B1 | * | 12/2001 | Madoukh .................... | 713/200 |
| 6,389,540 B1 | * | 5/2002 | Scheifler et al. ............ | 709/225 |

OTHER PUBLICATIONS

Tsaoussidis et al. Resource Control of Distributed Application in Heterogenous Environments. IEEE. 1998. pp. 380–383.*

Tullmann et al. Nested Java Processes: OS Structure for Mobile Code. ACM. 1998. pp. 111–117.*

P. Homburg et al., "An Object Model for Flexible Distributed Systems," Vrije Universiteit Amsterdam, Mar. 1995.

L. van Doorn et al., "Paramecium: An extensible object-based kernel," IEEE Computer Society Technical Committee on Operating Systems and Application Environments, Los Alamitos, CA, p. 86–89, May 1995.

L. van Doorn, "A secure Java™Virtual Machine,"IBM T.J. Watson Research Center, Yorktown Heights, New York.

* cited by examiner

*Primary Examiner*—Gregory Morse
*Assistant Examiner*—Wei Zhen
(74) *Attorney, Agent, or Firm*—Louis P. Herzberg (57) ABSTRACT

The Virtual Machine is viewed by many as inherently insecure despite all the efforts to improve its security. This invention provides methods, apparatus, and computer products to implement a system that provides operating system style protection for code. Although applicable to many language systems, the invention is described for a system employing the Java language. Hardware protection domains are used to separate Java classes, provide access control on cross domain method invocations, efficient data sharing between protection domains, and memory and CPU resource control. Apart from the performance impact, these security measures are all transparent to the Java programs, even when a subclass is in one domain and its superclass is in another, when they do not violate the policy. To reduce the performance impact, classes are grouped and shared between protection domains and map data lazily as it is being shared. The system has been implemented on top of the Paramecium operating system used as an example of an extensible operating system application.

59 Claims, 7 Drawing Sheets

```
class BitMap { // Domain A
    private static int N = 8, M = 8;
    protected byte bitmap[][];

protected BitMap() {
        bitmap = new byte[N/8] [M];
    } protected void set(int x, int y) {
        bitmap[x/8][y] |= 1<<(x%8);
    }
} class draw extends BitMap { // Domain B
    public void point(int x, int y) {
        super.set(x, y);
    } public void box(int x1, int y1,
                    int x2, int y2) {
        for (int x = x1; x < x2; x++)
            for (int y = y1; y < y2; y++)
                bitmap[x/8][y] |= 1<<(x%8);
    }
}
```

FIG. 6

```
COLLECT()
    for (;;) {
        for (d in Domains)
            MARK(d)
        SWEEP();
    }

MARK(d: Domain) : // marker phase
    color[d, (exported) root set] = grey
    do {
        dirty = false
        for (c in Cells) {
            if (color[d, c] == grey) {
                color[d, c] == black
                for (h in children[c]) {
                    color[d, h] == grey
                    if (EXPORTABLE(c, h))
                        export[d, h] |= export[d, c]
                }
                dirty = true
            }
        }
    } while (dirty)

SWEEP() : // sweeper phase
    for (c in Cells) {
        used = false
        for (d in Domains) {
            if (color[d, c] == white) {
                export[d, c] = nil
                UNMAP(d, c)
            } else
                used = true
            color[d, c] = white
        }
        if (used == false)
            DELETE(c)
    }

ASSIGN(a, c) : // pointer assignment
    *a = c
    d = current domain
    export[d,c] |= export[d,a]
    if (color[d, c] == white)
        color[d, c] = grey EXPORT(d: Domain, c: Cell) : // export object
    color[d,c] = grey
    export[d,c] |= owner(c)
    export[owner(c),c] |= d
```

FIG. 7

INTEGRATING OPERATING SYSTEMS AND RUN-TIME SYSTEMS

CROSS-REFERENCE TO RELATED APPLICATIONS

This application claims priority from Provisional Applications, Ser. No. 60/134,900 and Ser. No. 60/134,804, both filed 5/19/99.

FIELD OF THE INVENTION

This invention is related to the field of system security. It is more particularly related to integration of the language run-time systems and operating systems.

BACKGROUND THE INVENTION

Traditionally, the programming language field has concentrated on designing efficient run-time systems. The operating system field on the other hand has traditionally dealt with issues like security, fault isolation, and resource control. With the advent of new programming languages, like Java™, (Java is a trademark of SUN MICROSYSTEMS INC.) attempts have been made to add security to the programming language. These attempts are viewed as inherently insecure by most experts in the field.

It is advantageous to have a virtual machine that integrates operating system style security, fault isolation, and resource control with semantic information provided by the programming language system. This enables provision of a much finer grained protection than is possible in an operating system, hardware fault isolation between these protection units, and fine grained resource control. None of these are presently available at an operating system or language level.

Introduction

Consider Java as an example. Java is a general-purpose programming language that has gained popularity as the programming language of choice for mobile computing. It is a language used for World Wide Web Programming, smart card programming, embedded device programming, and even for providing executable content for active networks. The three main reasons for this popularity are Java's portability, its security properties, and its lack of explicit memory allocation. It is thus chosen as an example to show the deficiencies of current technology, and is herein used to describe the present invention to overcome these deficiencies.

A Java program consist of classes and objects which are compiled into machine-independent byte codes. These byte codes are executed by a Java Virtual Machine (JVM). This abstract machine provides a uniform execution environment over different architectures and operating systems. Besides portability, the Java Virtual Machine and a standardized set of Java packages also provide a number of security mechanisms to enforce protection among Java code. These built-in security mechanisms protect the JVM and benign programs from possible malevolent programs and restricts access to the system resources.

The Java security functionality is implemented in three layers. At the lowest level the byte code verifier verifies the validity of a Java class by performing control and data flow analysis on its byte codes. This establishes that the class confines its control transfers to valid locations inside that class and prevents the construction of references to data elements outside its scope.

The second security level is implemented by the Java security manager. This is a reference Monitor that has to be invoked explicitly, at the object's discretion, by each method to control access to the object's instance state.

The third protection level consists of signed Java code. Remote code is confined to a sandbox which prevents it from accessing System resources unless it was signed with the digital signature from an authority trusted by the JVM. In that case the code has full access to the system.

With the introduction of JDK 2 this security model has been enhanced to Support multiple security policies. A security Policy defines a set of permissions to system resources which are available to the code. Which policy is used depends on the digital signature attached to the code. Unlike the previous versions of the JDK, all code is signed. The permission sets define domains of Java classes which are granted the same rights.

The Java security model depends solely on the correctness of the Java Virtual Machine to isolate Java code. This is a problem in that a number of serious security flaws have been reported in various JVM implementations. More fundamental is the dependence on the correctness of a large program (for example, JDK 2 contains ~1.6M lines of code) when software engineering research indicates that every 1000 lines of code may contain 35–80 bugs. Even very thoroughly tested programs still may contain about 0.5–3 bugs per 1000 lines of code.

Hardware virtual machines (i.e., CPU and MMU) on the other hand generally have a much better track record. Security sensitive hardware components like the MMU are much better understood and their isolation and interaction with the rest system are much better defined than for complex software systems. Hence hardware based solutions provide better security.

A second problem with Java's security model is the discretionary security policy which is enforced by the security manager. For executing mobile code on the JVM and having it access System resources a mandatory security policy is better suited. That is, the security policy should be enforced outside of the executing Java program and could potentially be different for each Java class.

SUMMARY THE INVENTION

In order to overcome these problems the present invention provides a secure JVM which uses hardware protection domains to transparently and securely protect Java applets. The JVM tightly integrates operating system protection methods with the extra semantic information provided by the language run time system. It consists of a Java Nucleus process that loads Java classes into separate hardware protection domains and mediates access between them in much the same way processes are kept isolated by an operating system. In addition, the secure JVM solves a number of hard Java problems, such as providing resource access and resource usage control. All these security measures are, in the absence of security violations, transparent to the Java code.

The Java Nucleus uses an efficient inter-process communication mechanism for cross domain method invocations and uses shared memory to share data among different protection domains. The data is shared on demand using virtual memory remapping. In order to prevent false sharing or fragmentation data is relocated at run time. Data is shared as a result of a reference being passed as a cross protection domain method invocation (XMI) or the sharing of an object instance state. The garbage collector, which is a part of the Java Nucleus, handles multiple protection domains, run time data relocation, shared memory and the revocation of shared memory.

The present invention does not rely on software fault isolation techniques to enforce protection. Systems that do provide hardware protection are generally based on multiple independent JVM's connected through an optimized remote method invocation (RMI) or shared memory implementation. RMI requires source annotations and uses a stub compiler for generating marshaling routines. None of these systems are fully transparent to the Java programs.

Thus an aspect of the present invention is to provide a virtual machine that integrates operating system style security, fault isolation, and resource control with semantic information provided by the programming language system. This enables among other things:

1) provision of a much finer grained protection than is possible in an operating system, 2) hardware fault isolation between these protection units, and 3) fine grained resource control. Neither of these were previously possible at operating system or language level.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION THE INVENTION

The present invention is most advantageously applied to the integration of a programming language system and an operating system when the programming language exhibits the following language system properties:

1. a well defined unit of protection embedded in the language. These units form the basis of the protection. Examples of these units are classes, objects, and modules;

2. each protection unit has one or more interfaces. These interface are used to communicate between the protection units;

3. automatic storage reclamation (garbage collection). Rather than the programmer managing the allocated memory, the language system manages it, and the operating system has the property of including the ability to have low-level control over hardware protection domains, fault event redirection, and efficient IPC mechanism.

Although the concepts of the present invention are generally applicable to many languages, a language that provides these properties is particularly suitable for the description outlined below. This includes, for example, Smalltalk, ML, Java, Self, etc. In the description of the present invention, the implementation of the integration of a Java language run-time system and an operating system is described which provides hardware fault isolation for Java.

Firstly, an extensible operating system, Paramecium, on which an embodiment of the secure JVM is based is described. Paramecium is further described in a paper entitled, "Paramecium: An extensible object-based kernel," by L. van Doorn, P. Homburg and A. S. Tanenbaum, Proc. of the 5th Hot Topics in Operating Systems (HotOS) Workshop, Orcas Island, Wash., May 1995, 86–89, incorporated herein in entirety by reference.

Paramecium

Paramecium is an object-based extensible operating system for building application-specific operating systems. Central to its design is a common software architecture for its operating system and application components. Together these form a component repository. The Paramecium nanokernel provides some minimal support to dynamically load a component out of this repository either into a kernel or a user address space and to make it available through a name space. Determining which components reside in user and kernel space is established by the user at load-time. This is further described in the paper entitled, "Paramecium: An extensible object-based kernel," by L. van Doorn, P. Homburg and A. S. Tanenbaum, referenced above.

The nanokernel is a protected and trusted kernel which implements only those services that cannot be moved into the application without jeopardizing the system's integrity. All other system components, like thread packages, device drivers, and virtual memory implementations reside outside this nucleus. Kernel safety is maintained by allowing only those components to be downloaded into the kernel that carry a signature trusted by the kernel.

The kernel provides three basic services, which all use a protection domain as their unit of granularity. These services are: event service, memory service, and name space management. Each resource managed by these services is identified by a system-wide resource identifier. These resource identifiers act as classic capabilities and should be kept private. The event service implements Paramecium's pre-emptive event mechanism. Two kinds of events exist: user defined events, and processor events (synchronous traps and asynchronous interrupts). Associated with each event are one or more handlers. A handler consists of a protection domain identifier, the address of a call-back function, and a stack pointer. Raising an event either explicitly or through a processor related trap or internists causes control to be transferred to the handler specified by the protection domain identifier and call-back function using the specified handler stack. The event service also has provisions for the handler to determine the identity of caller's domain. This can be used to implement discretionary access control.

Memory management is separated into physical and virtual memory management. The physical memory service allocates physical pages which are then mapped onto a virtual memory address using the virtual memory service. Each physical page is identified by a generic system-wide resource identifier. Shared memory is implemented by passing this physical page resource identifier to another protection domain and have it map it into its virtual address space.

Paramecium implements multiple protection domains. Each protection domain is a mapping of virtual to physical pages together with a set of domain specific events. These domain events are raised on, for example, division by zero traps when this particular domain is in control.

The protection domain's virtual memory space is managed by the virtual memory service. This service implements functions to map physical pages onto virtual addresses, set virtual page attributes (e.g., read-only, read-write, execute-only), and unmap them. Each virtual page has associated with it a fault event that is raised, if set, when a fault occurs on an address within that page. These faults include among others: an instruction access fault when a page is marked as non-executable or a data access fault when a write occurs to a read-only page. A generic fall back event is raised when no event is associated with a virtual page.

The event handlers for a virtual page fault do not have to reside in the same protection domain where the fault occurs. These. can be handled by an external process that, for example, implements demand paging or, as in the secure JVM, maintains full control over the protection domains that are executing Java programs.

Figure 1:
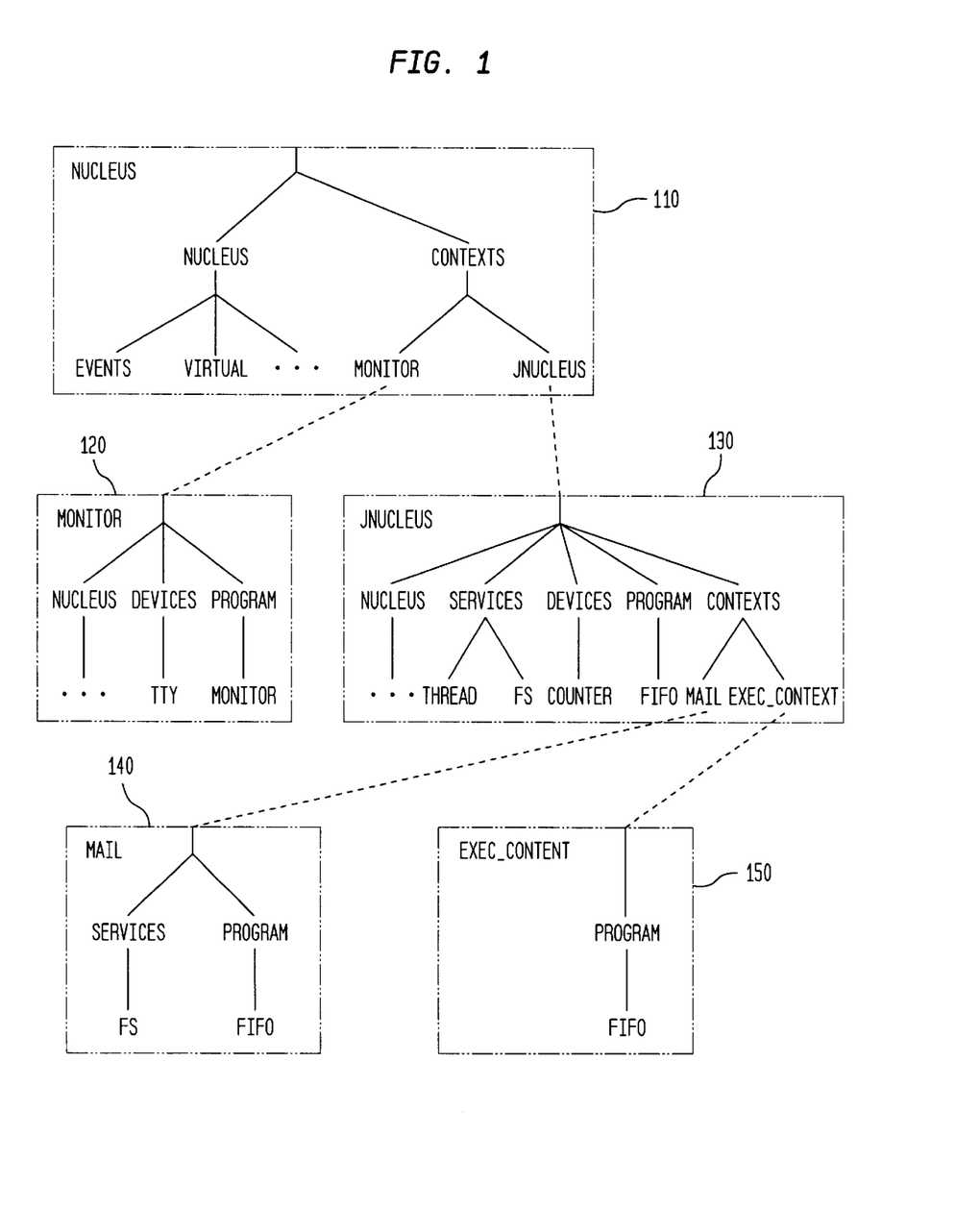
FIG. 1 shows an example of a Paramecium name space in accordance with the present invention.

Paramecium organizes its components into objects and each object has one or more interfaces associated with it. Each interface contains one or more methods that operate on the object at hand. Object references are stored in a hierarchical name space which is maintained by the kernel. Each protection domain has a view of its own subtree of the name space, the kernel address space has a view of the entire tree including all the subtrees of different protection domains. An example showing Paramecium name spaces is shown in FIG. 1. It shows mane spaces for a Nucleus 110, a Monitor 120, a Jnucleus 130, mail 140 and exec-content 150.

Standard operations exist to bind to an existing object reference, load an object from the repository, and to obtain an interface from a given object reference. Binding to an object happens at run time. To reconfigure a particular service you override its name. A search path mechanism exists to control groups of overrides. When an object is owned by a different address space the name service automatically instantiates proxy interfaces.

When a Protection domain is created it is given as argument the root of its name space. Depending on the names in its space it can contact external services. For example, the file server is known as "/services/fs". Binding to this name and obtaining a file system interface enables the process to create and delete files by invoking the methods from the interface. When the name is not present in the name space no file system operations are possible. By default, protection domains are created with an empty name space.

The Paramecium kernel itself is relatively small: 60 KB on a Sun SPARCClassic. Its cross context IPC latency is less than 5 usec (50 MHz MicroSparc). The kernel defines a small number of other services which are generally considered to be essential: a secure random number generator, and a device manager. This last service arbitrates between drivers to get access to devices. Everything else is loaded on demand, including the thread package, TCP/IP stack memory allocators and applications.

Paramecium's thread package is implemented as a separate component. It provides a priority scheduler, support for migratory and pop-up threads. In Paramecium, the thread of control can migrate from one protection domain to another without actually switching threads or changing the thread identifier. This saves a number of context switches which are required by system that hand off work from a thread in one domain to a thread in another domain. Pop-up threads are used to turn asynchronous events into threads. They are akin to optimistic active messages and delay the actual creation of the thread until there is contention on a lock. Pop-up threads are mainly used by device drivers.

When a thread is executing in a protection domain different from the domain where the thread code resides, a cross domain method call is necessary to Communicate with the thread package. In order to reduce this overhead for thread synchronization primitives, the synchronization state is shared between multiple protection domains. For example, the mutex implementation uses an atomic exchange operation to grab the lock. When the lock state is shared the atomic exchange is performed within each protection domain. only when there is contention on the lock is a cross domain-call made to the thread package to block the current thread and schedule a new one. This mechanism is integrated into the thread implementation. When an implementation is instantiated and it detects another thread package in its name space, it will negotiate and implement the state sharing.

Security Model

The security provided by the secure JVM consists of hardware fault isolation among groups of classes and their object instances by separating them into multiple protection domains and controlling access to methods and state shared between them. Each security policy, a collection of permissions and accessible system resources, defines a protection domain. Classes with the same security policy are grouped in the same domain and have unrestricted access to the methods and state within it. Invocations of methods in other domains pass through the Java Nucleus. The Java Nucleus is a trusted component of the system and it enforces access control based on the security policy associated with the source and target domain.

Figure 2:
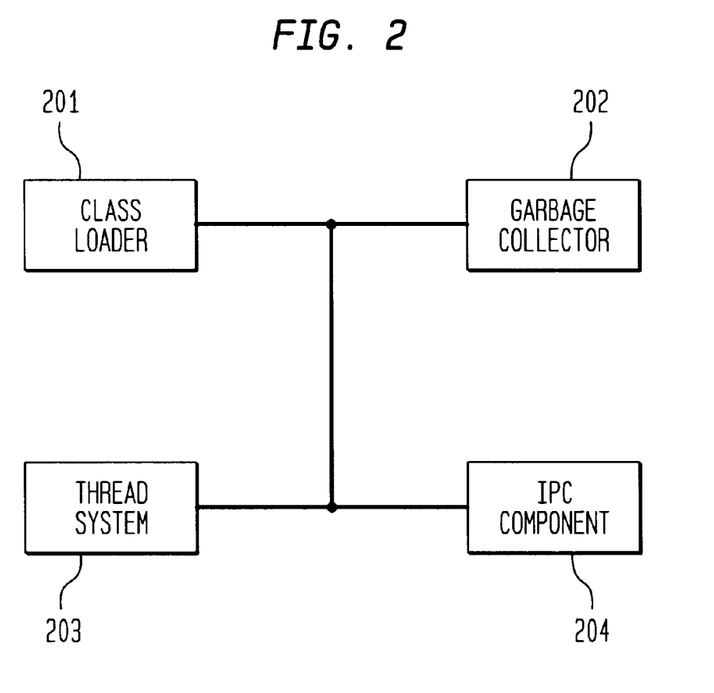
FIG. 2 shows an overview of the nucleus in accordance with the present invention.

The secure Java Nucleus includes four components shown in FIG. 2. These are: a class loader 201, a garbage collector 202, a thread system 203, and an IPC component 204. The class loader 201 loads a new class, translates the byte codes into native machine codes, and deposits them into a specified protection domain. The garbage collector 202 allocates and collects memory over multiple protection domains, assists in sharing of memory among them, and implements memory resource control. The thread system 203 provides the Java threads of control and maps them directly onto Paramecium threads. The IPC component 204 implements cross protection domain invocations, access control, and CPU resource control.

In an embodiment of the invention, the trust model (i.e., what is included in the minimal trusted computing base) depends on the correct functioning of the garbage collector 202, IPC component 204, and thread system 203. It does not have to depend on the correctness of the byte code translator. When the byte code translator is trusted separate executable content from data certain optimizations are possible.

The secure JVM allows references to memory cells (primitive types or objects) to be passed to other protection domains as part of a cross domain method invocation (XMI) or object instance state sharing. Passing a reference results in passing the full closure of the reference. That is, all cells that can be obtained by de-referencing the pointers contained in the cell of which the reference is passed. References are similar to capabilities and suffer the problems of confinement and revocation. Solving these is generally straightforward but violates the Java language transparency requirement and have therefore not been explored further.

The system of the present invention does not depend on the Java security features such as byte code verification, discretionary access control through the security manager, and its type system. These are viewed as language security measures that assist the programmer during programs development and should not be confused or combined with system security measures. The latter isolates and mediates access between protection domains and resources; these measures are independent of the language. Integrating operating system style protection with the semantic information provided by the language run time system, however, does allow finer grained protection and sharing than is possible in contemporary systems.

The security guarantees provided by an embodiment of the secure JVM are summarized in Table 1. These guarantees comprise the security policy provided by the JVM. They include a set of system resources available to each protection domain, classes whose implementation is shared between multiple domains, object instance state that is shared, and access control for each cross domain method invocation.

TABLE 1

| Security guarantees | |
| --- | --- |
| Granularity | Mechanism |
| Method | Invocation access control |
| Class | Instruction text sharing between domains |
| Class | Object sharing between domains |
| System | Paramecium name space per domain |

A first method of protection is a per method access control for each method in a different protection domain. Each method has associated with it a list of domains that can invoke it. If the invokee is not in this set, access is denied. Protection is between domains, not within domains, hence there is no access control for method invocations in the same domain.

To reduce the number of cross protection domain calls (XMI$_s$) the class text (instructions) are shared between multiple domains. This is analogous to text sharing in UNIX, in which the instructions are loaded into memory only once and mapped into each domain that uses it. This generally reduces memory requirements and in the present invention it eliminates the need for expensive XMIs. The object instance state is still private to each domain.

Object instance state is transparently shared between domains when references to it are passed over XMIs or when an object inherits from a class in a different protection domain. Which objects can be passed between domains is controlled by the Java programs and not by the JVM. Specifying this as part of the security policy would break the Java language transparency requirement. Per method access control gives the JVM the opportunity to indirectly control which references are passed.

Fine grained access control over the system resources is provided by the Paramecium name space mechanism. If a service name is not in the name space of a protection domain, that domain cannot get access to the service. The name space for each protection domain is constructed and controlled by the Java Nucleus of the present invention.

To reduce the number of XMIs the classes with the same security policy are grouped into the same protection domain. The number of XMIs can be further eliminated by sharing the instruction text of class implementations between different domains. Table 2 summarizes the potential threats the secure JVM can handle, together with their primary protection mechanism. Some

TABLE 2

| Threat model | |
| --- | --- |
| Threat | Protection Mechanism |
| Fault isolation | Protection domains |
| Denial of service | Resource control |
| Forged object references | Garbage collector |
| Illegal object invocations | XMI access control | threats, like covert channels, are not generally handled with the system of the present embodiment.

Secure Java Virtual Machine

The Java Nucleus forms the minimal trusted computing base (TCB) of the secure JVM. The key techniques and algorithms used by the Java Nucleus are now described. The Java Nucleus provides a uniform naming scheme for all protection domains, including the Java Nucleus. It provides a single virtual address space where each protection domain can have a different protection view. All cross protection domain method invocations (XMIs) pass through the Java Nucleus to control access and used CPU resources. Data is shared on demand between multiple protection domains, i.e. whenever a reference to shared data is dereferenced. The Java Nucleus uses shared memory and run time reallocation techniques to accomplish this. Only references passed over an XMI or object instances whose inherited classes are in different protection domains can be accessed. Others will cause security violations. The implementation of these protection mechanisms depends on the garbage collector to allocate and de-allocate typed memory, reallocate memory, keep track of ownership and sharing status, and control used memory resources.

A particular embodiment uses the techniques described below to build a secure JVM using an interpreter rather than a compiler. Each protection domain has a shared copy of the interpreter interpreting the Java byte codes for that protection domain.

Memory Organization

An embodiment of the Java Virtual Machine assumes a single address space in which references can be passed between method invocations. This and Java's dependence of garbage collection prescribed the memory organization of the present invention for the JAVA application.

The memory is organized into a single virtual address space. Each protection domain has, depending on its privileges, a view onto this address space. This view includes a set of physical memory pages to virtual mappings together with their corresponding access rights. A small portion of the virtual address space is reserved by each protection domain to store per domain specific data.

Central to the protection domain scheme is the Java Nucleus. The Java Nucleus is analogous to an operating system kernel. It manages a number of protection domains and has full access to all memory mapped into these domains and their corresponding access permissions. The protection domains themselves cannot manipulate the memory mappings or the access rights of their virtual memory pages. The Java Nucleus handles both data and instruction access (i.e., page) faults for these domains. Page faults are turned into appropriate Java exceptions when they are not used by the system.

Figure 3:
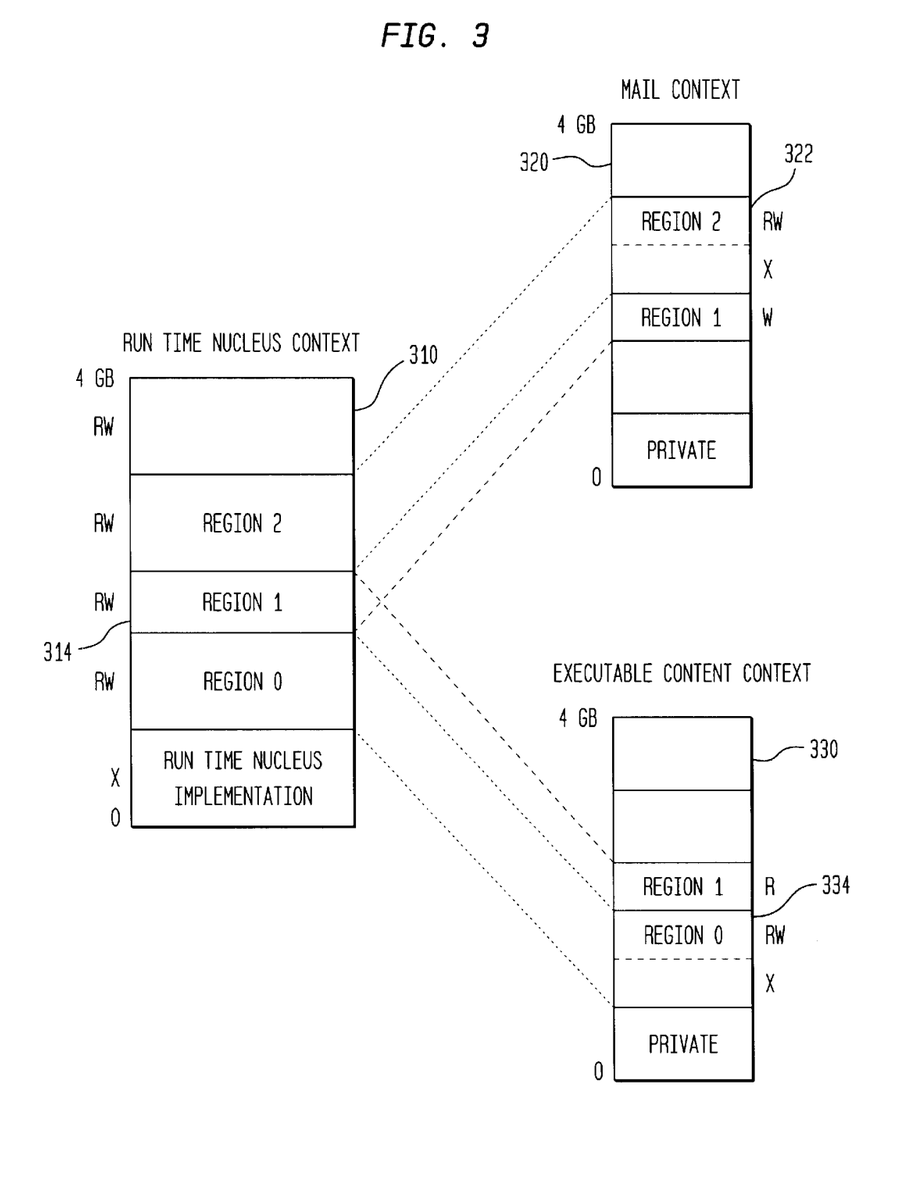
FIG. 3 shows an example of a memory map in accordance with the present invention.

FIG. 3 shows an example of a Java nucleus memory map. It includes a Run Time Nucleus Context 310, a Mail Context 320 and an Executable Content Context 330. For convenience, the memory available to all protection domains is mapped into the Java Nucleus with read/write permission. This allows it to quickly access the data in different protection domains. Because memory addresses are unique and the memory pages are mapped into the Java Nucleus address space, the Java Nucleus does not have to map or copy memory as an ordinary operating system kernel.

The view different protection domains have of the address space depends on the mappings created by the Java Nucleus. In FIG. 3 a mail reader application resides in the context named Mail Context 220. For efficiency reasons, all classes constituting this application reside in the same protection domain. For example, all executable content embedded in an e-mail message is executed in a separate domain, say executable content. In this example memory Region 0 is mapped into the executable content context 330. Part of this memory contains executable code and has the execute privilege associated with it. Another part contains the stack and data and has the read/write access. Region 0 334 is only visible to the Executable Content Context 330, and not to the Mail Context 320. Likewise, Region 2 322 is not visible to the Executable Content Context 330. Because of the hardware memory mappings these two contexts are physically separated.

Region 1 214 is used to transfer data between the two contexts and is set up by the Java Nucleus. Both contexts have access to the data, although the executable content context 230 has only read access. Violating this access privilege causes a page (data access) fault to be generated which is handled by the Java Nucleus. It will turn the fault into a Java exception.

Note that in the embodiment described, the Java Nucleus is an ordinary Paramecium component. It can be instantiated either into the kernel or into a user protection domain. Although oblivious to the Java Nucleus there is a performance and integrity tradeoff that warrants the one or the other. The ease with which the Java Nucleus can create protection domains and manipulate mappings is due to Paramecium's lightweight protection domains, fault events, and the decoupling of physical and virtual memory.

Cross Domain Method Invocations

A cross domain method invocation (XMI) mimics a local method invocation except that it crosses a protection domain boundary. In the embodiment, described the (XMI) mechanism is loosely based on Paramecium's system call mechanism which uses events. The following example illustrates the steps involved in an XMI.

Consider the protection Domains A and B and a Method M which resides in Domain-B. An instruction fault occurs when A calls Method M, since M is not mapped into context A. The fault causes an event to be raised in the Java Nucleus. The event handler for this fault is passed two arguments: the fault address (i.e., method address) and the fault location (i.e., call instruction). Using the method address, the Java Nucleus determines the method information which contains the destination domain and the access control information. Paramecium's event interface is used to determine the caller domain. Based on this information, an access decision is made. If access is denied, a security exception is raised in the caller domain.

Using the fact that method information is static and domain information is static for code that is not shared, we can improve the access control check process. Rather than looking up this information, the Java Nucleus stores this information in the native code segment of the calling domain. This information can then be accessed quickly using a fixed offset and fault location parameter. The call trampoline code fragment in context A for calling method M appears as (in SPARC assembly):

| | |
|---|---|
| call M | call method M |
| mov %g0, %i0 | nil object |
| b,a 1f | branch over |
| .long <caller domain> | JNucleus data |
| .long <method info> | JNucleus data |

The information stored in the caller domain should be protected from tampering. This is achieved by mapping all executable native code as execute only; only the Java Nucleus has full access to it. For example, in architectures wherein code can only be marked as read-execute, these pointer values expose some internal state of the Java Nucleus (the location of these data structures). This is harmless since there is no way to present this information back to the Java Nucleus from a user context nor can a user context create an executable memory segment.

When access is granted for an XMI an event is associated with the method, if one is not already present. Then the arguments are copied into the registers and onto the event handler stack as dictated by the calling frame convention. No additional marshaling of the parameters is required. Both value and reference parameters are passed unchanged. Using the method's type signature to identify reference parameters, data references are marked as exported roots (i.e., garbage collection roots). Instance data is mapped on demand as described below. Invoking a method on an object reference causes an XMI to the method implementation in the object owner's protection domain.

Virtual method invocations wherein a set of targets is known at compile-time but the actual target is known only at run time, require a lookup in a switch table. The destinations in this table refer to call trampolines rather than the actual method address. Each call trampoline includes the code fragment described above.

Using Paramecium migratory threads, an XMI just extends the invocation chain of the executing thread into another protection domain. Before raising the event to invoke the method, the Java Nucleus adjusts the thread priority according to the priority of the destination protection domain. The original thread priority is restored on the method return. Setting the thread priority enables the Java Nucleus to control the CPU resources used by the destination protection domain.

The Java Nucleus requires an explicit event invoke to call the method rather than causing an instruction fault which is handled by the destination domain. The reason for this is that it is not possible in Paramecium to associate a specific stack (i.e., the one holding the arguments) with a fault event handler. Hence the event has to be invoked directly. This influences the performance of the system depending on whether the Java Nucleus is instantiated in a separate address space or as a module in the kernel. When the Java Nucleus is in a separate process an extra system call is necessary to enter the kernel. The invoked routine is called directly hen the Java Nucleus is instantiated as a kernel module.

Local method invocations use the same method call trampoline as the one outlined above, except that the Java Nucleus does not intervene. This is because the method address is available locally and does not generate a fault. The uniform trampoline allows the Java Nucleus to share class implementations among multiple protection domains by mapping them in. For example, simple classes like the java.lang.String or java.lang.Long can be shared by all Protection domains without security implications. Sharing class implementations reduces memory use and improves performance by eliminating XMIs. XMIs made from a shared class do not have their caller domain set, since there can be many caller domains, and require the Java Nucleus to use the system authentication interface to determine the caller.

Data Sharing

Passing parameters as part of a cross domain method invocation (XMI) requires little more than copying them by value and marking the reference variables as exported roots. Subsequent accesses to these references will cause a protection fault unless the reference is already mapped in. The Java Nucleus, which handles the access fault will determine whether the faulting domain is allowed access to the variable referenced. If allowed, it will share the page on which the variable is located.

Sharing memory on a page basis traditionally leads to false sharing or fragmentation. Both are clearly undesirable. False sharing occurs when a variable on a page is mapped into two address spaces and the same page contains other unrelated variables. This clearly violates the confinement guarantee of the protection domain. Allocating each variable on a separate page results in fragmentation with large amounts of unused physical memory. To share data efficiently between different address spaces, a garbage collector is used to reallocate the data at run time. This prevents false sharing and fragmentation.

Figure 4:
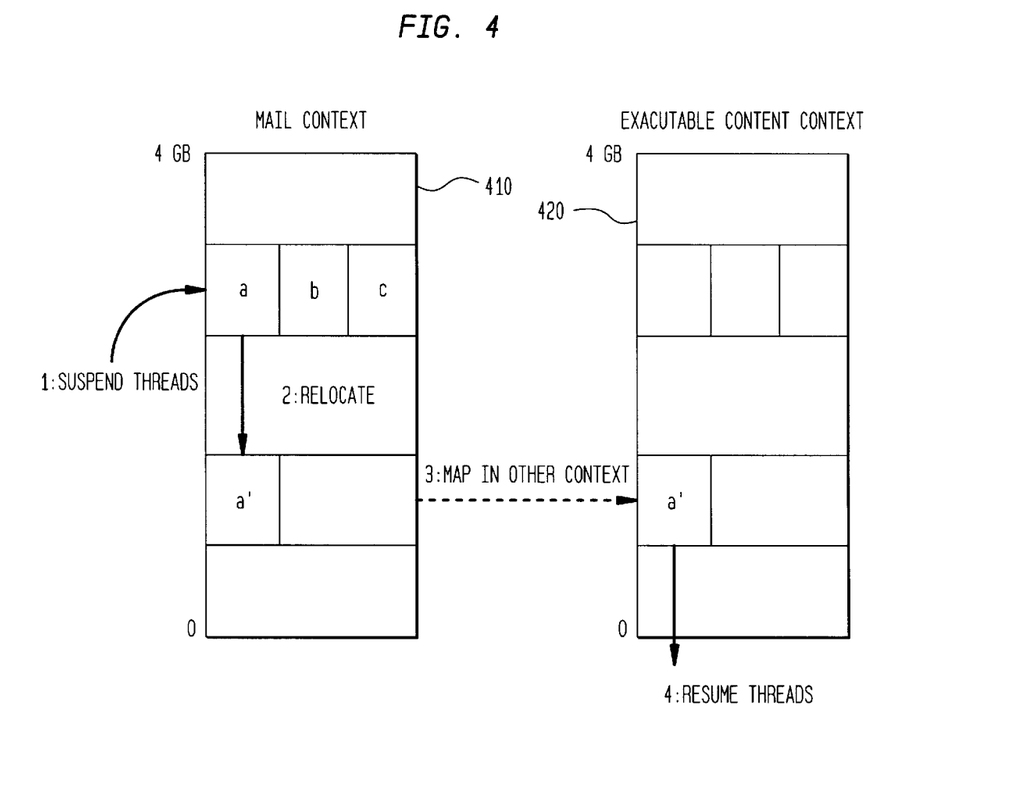
FIG. 4 shows an example of data remapping between address spaces in accordance with the present invention.

Consider FIG. 4 which shows an example of a remapping process to share a variable a between the Mail Context 410 and the Executable Content Context 420. In order to relocate this variable the garbage collector is used to update all the references. To prevent race conditions, the threads within or entering the contexts that hold a reference to a are suspended (step 1). Then the data, a, is copied onto a new memory page (or memory pages depending on its size) and referred to as a'. The other data on the page is not copied, so there is no risk of false sharing. The garbage collector is then used to update all references that point to a into references that point to a' (step 2). The page holding a' is then mapped into the other context (step 3). Finally, the threads are resumed, and new threads are allowed to enter the unblocked protection domains (step 4). The garbage collector will eventually delete a since it does not have any references to it.

It is advantageous that other variables shared between the same protection domains be tagged onto the already shared pages to reduce memory fragmentation. The process outlined above can be applied recursively. That is, when a third protection domain needs access to a shared variable the variable is reallocated on a page that is shared between the three domains.

In order for the garbage collector to update the cell references it has to be exact. That is, it should keep track of the cell types and of references to each cell to distinguish valid pointers from random integer values. The updating itself can either be done by a full walk over all the in-use memory cells or by arranging each cell to keep track of its references. The overhead of the relocation is amortized over it subsequent use.

In an embodiment of the invention, besides remapping dynamic memory, the mechanism is also used to remap static or class data. Absolute data memory references can occur within the native code generated by the just-in-time compiler. Rather than updating the native code on each relocation, the just-in-time compiler generates an extra indirection to a place holder holding the actual reference. This place holder is registered with the garbage collector as a reference location.

In an embodiment data remapping is not only used to share references passed as parameters over an XMI, but also to share object instance data between sub and superclasses in different protection domains. Normally, object instances reside in the protection domain in which their class was loaded. Method invocations on that object from different protection domains are turned into XMIs. In case of an extended (i.e., inherited) class the object instance state is shared between the two protection domains. This allows the sub and superclass methods to directly access the instance state rather than capturing all these accesses and turning them into XMIs. To accomplish this, the secure JVM uses the memory remapping technique outlined above.

The decision to share object instance state is made at the construction time of the object. Construction involves calling the constructor for the class followed by the constructors for its parent classes. When the parent class is in a different protection domain the constructor invocation is turned into an XMI. The Java Nucleus performs the normal access control checks as for any other XMI from a different protection domain. The object instance state, a reference to it is implicitly passed as the first argument to the constructor call is marked as an exportable root. The mechanisms involved in marking memory as an exportable root are discussed below.

A particular embodiment deviates from the strict language versus system protection stand by using the Java visibility rules (i.e., public and protected) to specify which parts of the shared object get mapped. This allows the programmer to give hints to the Java Nucleus to Control the granularity of protection when using inheritance.

Figure 5:
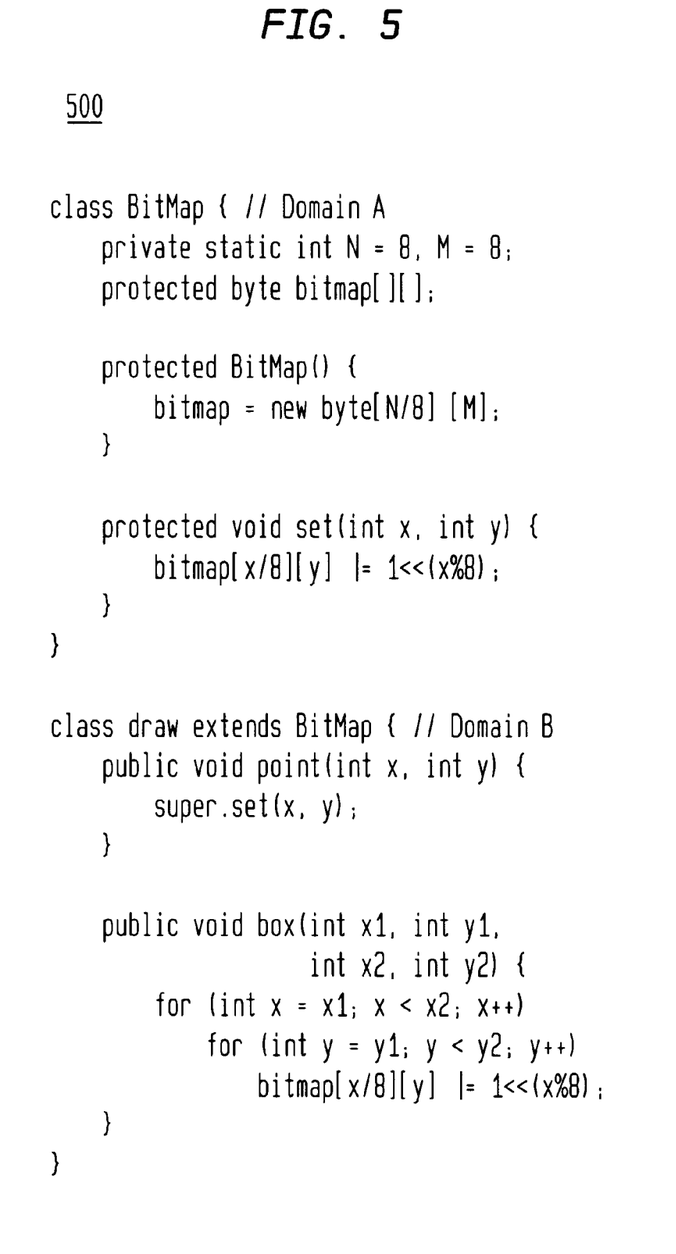
FIG. 5 shows an example of a program in accordance with the present invention.

An example embodiment of state sharing between super and subclass is shown in FIG. 5 for a simple box drawing class 500. Here the class BitMap and all its instances reside in protection Domain-A. Protection Domain-B contains all the instances of the class Draw. This class is an extension of the BitMap class which resides in a different protection domain. When a new instance of Draw is created the Draw constructor is called to initialize the class. In this case the constructor for Draw is empty and the constructor for the superclass BitMap is invoked. Invoking this constructor causes a transfer into the Java Nucleus.

The Java Nucleus first checks the access permission for Domain-B to invoke the BitMap constructor in Domain-A. If granted, the object pointer is marked as an exportable root and passed as the first implicit parameter. Possible other arguments are copied as part of the XMI mechanism and the remote invocation is performed. The BitMap constructor then assigns a new array to the bitmap field in the Draw object. Since the assignment is the first dereference for the object it is remapped into Domain-A. When the creator of the Draw object calls 'box' and dereferences 'bitmap' it is remapped into Domain-B. This is because the array is reachable from an exported root cell to Domain-A. Further calls to 'box' do not require this remapping. A call to 'point' results in an XMI to Domain-A where the superclass implementation resides. Since the Draw object was already remapped by the constructor it does not require any remapping.

Whenever a reference is shared among address spaces all references that are reachable from it are also shared and will be mapped on demand when referred to. This provides full transparency for Java programs which assume that a reference can be passed among all its classes. A potential problem with on demand remapping is that it dilutes the programmer's notion of what is being shared over the lifetime of a reference. This might obscure the security of the system. To strengthen the security in a particular embodiment, an implementation sometimes decides not to support remapping of objects at all or provide a non lazy form of instance state sharing. Not supporting instance state sharing prevents programs that use the object oriented programming model from being separated into multiple protection domains. For example, it precludes the isolation and sharing of the AWT package in a separate Protection domain.

A non lazy implementation of instance state sharing remaps a full closure of the visible instance data after the construction of the superclass. The advantage of this is that it clarifies to the programmer what is being shared. This has a disadvantage in that subsequent allocated data is not remapped. For example elements added to a list object after the construction are not remapped to the superclass protection domain.

Some embodiments are conservative with respect to references passed as arguments to cross domain method invocations and unmap them whenever possible to restrict their shared access. Rather than unmapping them at the invocation return time, which would incur a high call overhead this is advantageously deferred until garbage collection time. The garbage collector is aware of shared pages and determines whether they are reachable in the context they are mapped in. If they are unreachable, rather than removing all the bookkeeping information the page is marked invalid so it can be remapped quickly when it is used again. This does not work very well if the page contains two variables of which only one is passed as reference. In that case a new remapping is recommended. To reduce the amount of remappings, shared instance state and state passed as a reference to a cross domain invocation are allocated on separate pages.

Garbage Collection

Java uses garbage collection to reclaim unused dynamic memory. An embodiment of the present invention uses a non-copying incremental traced garbage collector which is part of the Java Nucleus. The garbage collector is responsible for collecting memory in all the address spaces it manages. A centralized garbage collector has the advantage that it is easier to share memory between different protection domains and enforce central access and resource control. An incremental garbage collector has better real time properties than non-incremental collectors.

It is advantageous that the garbage collector for the secure Java machine have the following properties:

1. Collect memory over multiple protection domains and protect the bookkeeping information from the potentially hostile domains.
2. Relocate data items at run time. (This property is used for sharing data across protection domains. For correctness an exact garbage collector is most useful rather than a conservative collector.)
3. Determine whether a reference is reachable from an exported root. (This enables operating such that only those variables that can be obtained via a reference passed as an XMI argument or instance state are shared.)
4. Maintain per protection domain, multiple memory pools with different access attributes. (These are execute only, read-only, and read-write pools that contain native code, read-only and read-write data segments respectively.)
5. Enforce resource control limitations per protection domain.

As discussed above protection domains share the same virtual address map albeit with different protection views of it. The Java Nucleus protection domain, which contains the garbage collector, has full read-write access to available memory. Hence collecting memory over different domains is confined to the Java Nucleus.

All tracing garbage collection algorithms assume a single address space in which all memory cells have the same access rights. In a system embodiment of the present invention, cells have different access rights depending on the protection domain accessing it and cells can be shared among multiple domains. Although access control is enforced through the memory protection hardware, it is the garbage collector that has to create and destroy the memory mappings.

Figure 6:
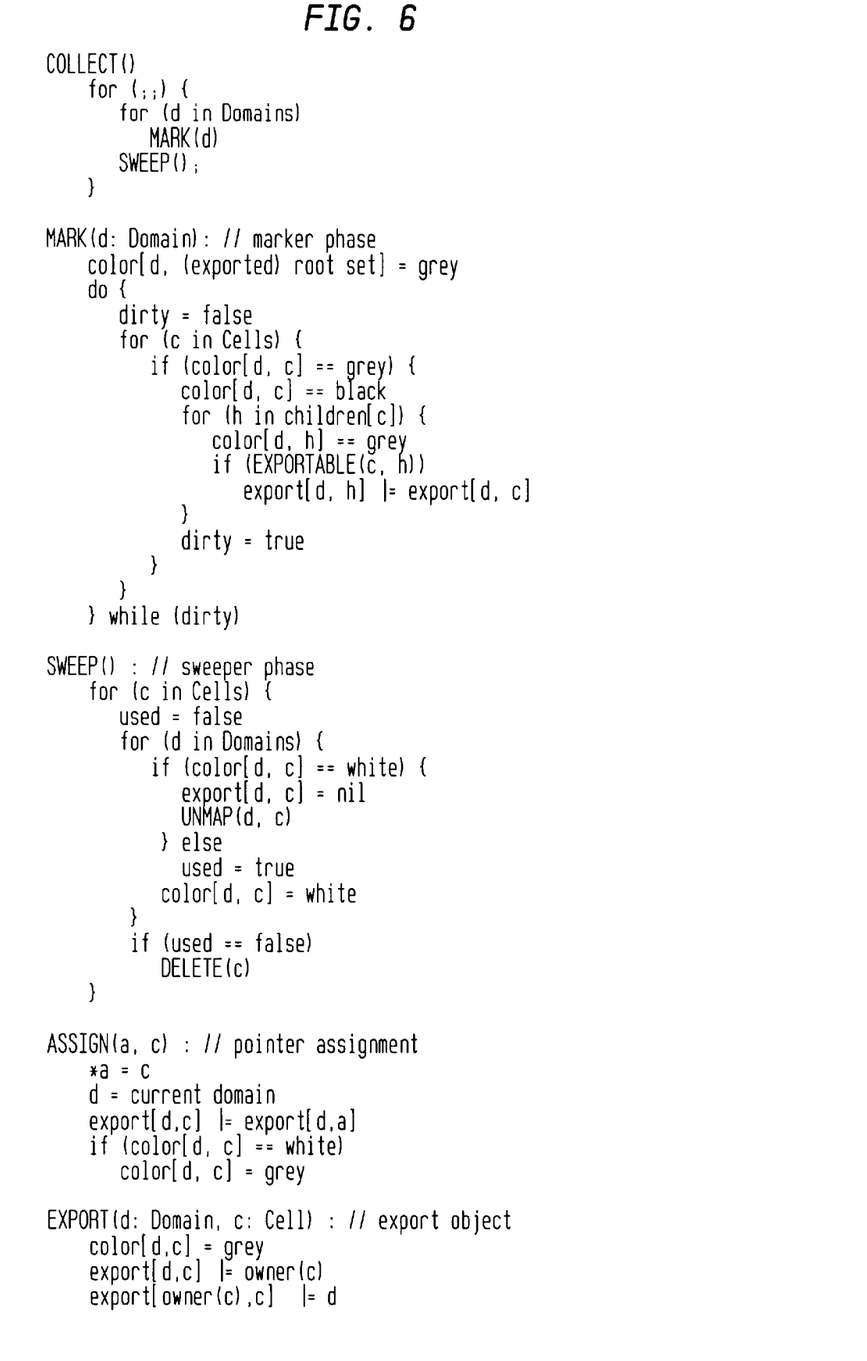
FIG. 6 shows the pseudo description for the garbage collection method in accordance with the present invention.

FIG. 6 shows an example of pseudo-code in an algorithm used for multiple protection domain garbage collection. It is an extension of a classic mark-sweep algorithm which runs concurrently with the mutators. In an embodiment the algorithm uses a tricolor abstraction in which all cells are painted with one of the following colors: black indicates that the cell and its immediate descendents have been visited and are in use; grey indicates that the cell has been visited but not all of its descendents or that its connectivity to the graph has changed; and white indicates untraced (i.e., free) cells. The garbage collection phase starts with all cells colored white and terminates when all traceable cells have been painted black. The remaining white cells are free and can be reclaimed.

The algorithm is extended to multiple protection domains by associating with each cell its owner domain and an export set. An export set denotes to which domains the cell has been properly exported. Garbage collection is performed on one protection domain at a time, each keeping its own color status to assist the marking phase. The marking phase starts with coloring all the root and exported root cells for that domain as grey. It then continues to examine all cells within that domain. If one of them is grey it is painted black and all its children are marked grey until there are no grey cells left. After the marking phase all cells that are used by that domain are painted black. The virtual pages belonging to all the unused white cells are unmapped for that domain. When the cell is no longer used in any domain it is marked free and its storage space is reclaimed. Note that the algorithm in FIG. 6 is a simplification of an actual implementation. Many improvements known to those skilled in the art are possible.

In an embodiment, cells are shared between other protection domains by using the remapping technique described above. In order to determine whether a protection domain, Domain-d, has access to a cell 'c', the Java Nucleus examines three cases. The trivial case is where the owner of 'c' is 'd'. In this case the cell is already mapped into Domain-d. In the second case the owner of 'c' has explicitly given access to 'd' as part of an XMI parameter or instance state sharing or is directly reachable from such an exported root. This is reflected in the export information kept by the owner of 'c'. Domain-d has also access to cell 'c' if there exists a transitive closure from some exported root 'r' owned by the owner of 'c' to some Domain-z. From this Domain-z there exists an explicit assignment that inserted 'c' into a data structure owned by 'd' or an XMI from the domains 'z' to 'd' passing cell 'c' as an argument. In case of an assignment the data structure is reachable from some other previously exported root passed by 'd' to 'z'. To maintain this export relationship each protection domain maintains a private copy of the cell export set. This set, usually nil and only needed for shared memory cells, reflects the protection domain's view of who can access the cell. A cell's export set is updated on each XMI (i.e., export) or assignment as show in FIG. 6.

Some data structures exist prior to, for example, an XMI passing a reference to it. In the embodiment, the export set information for these data structures is updated by the marker phase of the garbage collector. It advances the export set information from a parent to all its siblings taking the previously mentioned export constraints into account.

Maintaining an export set per domain is used to prevent forgeries. Consider a simpler design in which the marker phase advances the export set information to all siblings of a cell. This allows an attack in which an adversary forges a reference to an object in Domain-d and then invokes an XMI to 'd' passing one of its data structures which embeds the forged pointer. The marker phase would then eventually mark the cell pointed to by the forged reference as exported to 'd'. Maintaining a per protection domain export set for each cell makes forged pointers impossible.

Keeping a per protection domain export set generally reduces the cost of a pointer assignment operation. Storing the export set in the Java Nucleus would require an expensive cross protection domain call for each pointer assignment, by keeping it in user space this can be eliminated. Besides, the export set is not the only field that needs to be updated. In the classic Dijkstra algorithm the cell's color information needs to be changed to grey as described for FIG. 6. Both these fields are therefore kept in user space.

Figure 7:
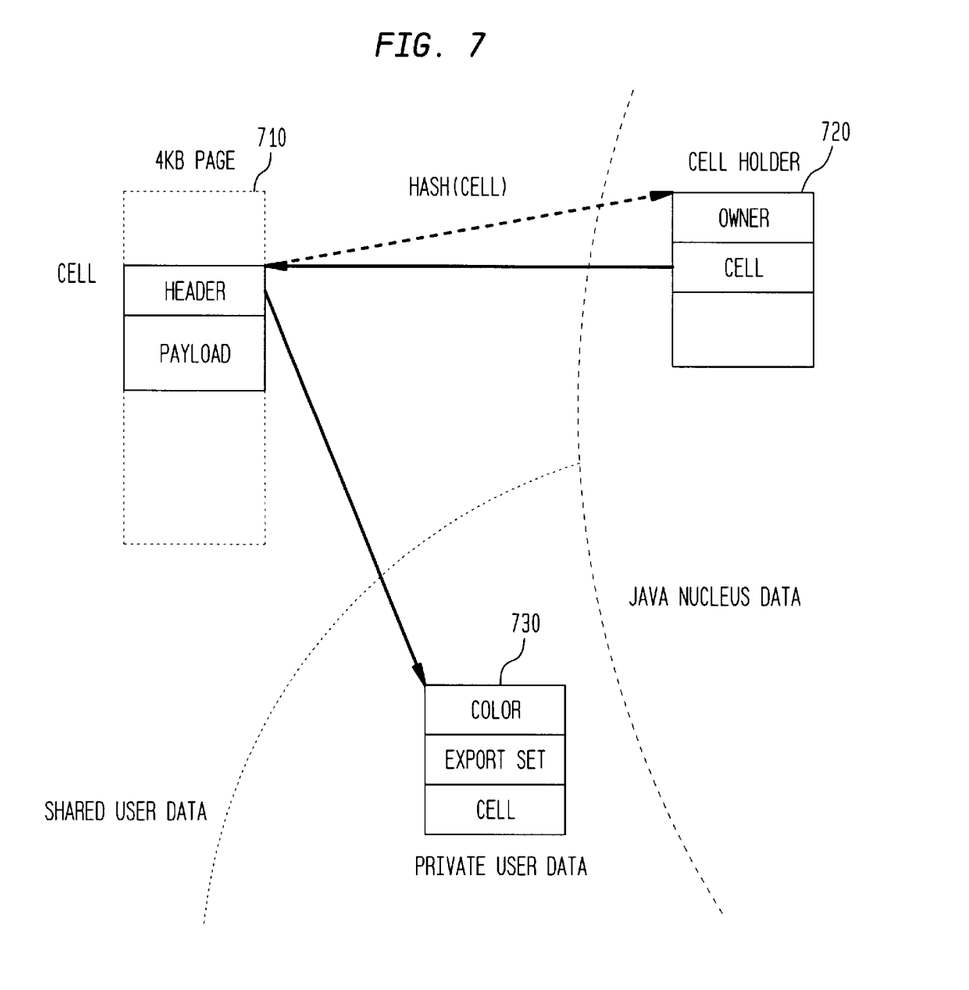
FIG. 7 shows an example of the garbage collector data structures in accordance with the present invention.

The cell bookkeeping information consists of three parts 710, 720 and 730, shown in FIG. 7. The public part 710 contains the cell contents and its per domain color and export information. These parts are mapped into the user address space, where the color and export information is stored in the per domain private memory segment, as for example shown in FIG. 3. The nucleus part 720 is only visible to the Java Nucleus. A page contains one or more cells where for each the cell content is preceded by a header pointing to the public information. The private information 730 is obtained by hashing the page frame number to get the per page information which contains the private cell data. The private cell data 730 contains pointers to the public data 710 for all protection domains that share this cell. When a cell is shared between two or more protection domains the pointer in the header of the cell refers to public cell information stored in the private domain specific portion of the virtual address space. Generally, the underlying physical pages in this space are different and private for each protection domain.

A particular embodiment advantageously amortizes the cost of garbage collection by storing one or more cells per physical memory page. When all the cells are free the page is added to the free list. Each protection domain includes three memory pools: an execute-only pool, a read-only pool, and a read-write pool. Cells are allocated from these pools depending on whether they contain, executable code, constant data, or volatile data. When memory becomes really tight, pages are taken from their free lists, their virtual pages are unmapped, and their physical pages returned to the system physical page pool. This allows them to be re-used for other domains and pools.

The garbage collector should be conservative in handling these user accessible data items when the color and export set fields are exposed. This does not, however, reduce the security of the system. The user application can, at most, cause the marker phase to loop forever, cause its own cells that are still in use to be deallocated, or hang on to shared pages. These problems are best addressed by bounding the marker loop phase by the number of in-use cells. Deleting cells that are in use will cause the program to fail eventually, and hanging on to shared pages is not different from the program holding on to the reference.

When access to a cell is revoked, for example as a results of an XMI return, its color is marked grey and it is removed from the receiving domain's export set. In some embodiments, this causes the garbage collector to reexamine the cell and unmap it during the sweep phase when there are no references to it from that particular domain.

To relocate a reference the Java Nucleus forces the garbage collector to start a mark phase and update the appropriate references. Since the garbage collector is exact it only updates actual object references. An alternative design for relocation is to add an extra indirection for all data accesses. This indirection eliminates the need for explicit pointer updates. Relocation of a pointer include updating its entry in the table. This method, however, has the disadvantage that it imposes an additional cost on every data access rather than the less frequent pointer assignment operation and prohibits aggressive pointer optimizations by smart compilers.

The amount of memory per protection domain is constrained. When the amount of assigned memory is exhausted an appropriate exception is generated. This prevents protection domains from starving other domains for memory.

A particular aspect of the present invention is the provision of a system to integrate hardware fault isolation to supplement language protection by tightly integrating the operating system and language run time system. Previous systems have not used hardware protection to separate language units of protection. These systems either provide no protection or depend on a trusted code generator.

Although the description of the concepts of the invention concentrates on Java, the techniques are applicable to other languages as well (e.g., SmallTalk and Modula3). This is particularly so when these languages are used with systems having garbage collection, have well defined interfaces, and have distinguishable units of protection. A number of systems provide hardware fault isolation by dividing the program into multiple processes and use a proxy based system like RMI or CORBA, or a shared memory segment for communication between them. This approach has a number of drawbacks that are not found in the method and/or system of the present invention. These drawbacks include:

1. Most proxy mechanisms use marshaling to copy the data. (Marshaling provides copy semantics which is incompatible with the shared memory semantics required by the Java language.)
2. The overhead involved in marshaling and unmarshaling the data is significant compared to on demand sharing of data.
3. Proxy techniques are based on interfaces and are not suited for other communication mechanisms such as instance state sharing. (The latter is important for object oriented languages.)
4. Proxy mechanisms usually require stub generators to generate proxy stubs and marshaling code. (These stub generators use interface definitions that are defined outside the language or require language modifications to accommodate them.)
5. It is harder to enforce centralized resource control within the system because proxy mechanisms encourage many independent instances of the virtual machine.

Some methods and/or systems focus on the resource control aspects of competing Java applets on a single virtual machine. These methods are integrated into a JVM implementation and require trust of the byte code verifier. The method of resource control of the present invention is at an operating system level.

Systems for dealing with Java security in an enterprise environment are known to those familiar with the art. In one such system, the Java byte code is vetted and compiled at a central and trusted machine in the enterprise network. From there the compiled and signed code is distributed to all the clients in the network. Although byte code verification and compilation are not required in the method and/or system of the present invention to enforce security, a centralized policy manager that vets Java code and cryptographically attaches a centralized security policy is useful.

Thus the security provided by the secure JVM includes separate hardware protection domains, controlled access between them, and system resource usage control. This is accomplished in a way that maintains transparency with respect to Java programs.

It is noted that the confinement and revocation problem are inherent to the Java language. A reference can be passed from one domain to another and revocation is entirely voluntary. These problems can be solved in a rather straightforward manner, but they do violate the transparency requirement. For example, confinement can be enforced by having the Java Nucleus prohibit the passing of references to cells for which the calling domain is not the owner. This could be further refined by requiring that the cell owner should have permission to call the remote method directly when its data is passed over it by another domain. Alternatively, the owner could mark the cells it is willing to share or maintain exception lists for specific domains. Revocation is nothing more that unmapping the cell at hand.

In the design of the secure JVM it is advantageous to delay expensive operations until they are needed. An example of this is the on demand remapping of reference values, since most of the time reference variables are never dereferenced. Some embodiments of the invention avoid cross-protection domain switches to the Java Nucleus. The most prominent example of this is a pointer assignment which requires access to the garbage collector state information. The solution of state splitting and per protection domain mapping of the per domain public state enables pointer assignments to be handled within the came context. This eliminates a large number of cross domain calls due to common pointer assignment operations.

It is further noted that the Java Nucleus is in a perfect position to make global cache optimization decisions because it has an overall view of the data being shared and the XMIs passed between domains. Assigning a direction to the data being shared allows fine grained control of the traversal of data. For example, a client can pass a list pointer to a server applet which the server can dereference and traverse but the server can never insert one of its own data structures into the list.

The Java Nucleus depends on user accessible low-level operating system functionality that is currently only provided by extensible operating systems (e.g., Paramecium, L4/LavaOS, ExOS, and SPIN). This functionality includes low-level control over address spaces, control over virtual and physical memory and the availability of efficient IPC and migratory threads. On a conventional operating system the Java Nucleus is advantageously implemented as part of the kernel.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Thus the present invention provides a method for integrating an operating system with a language run time system. The method includes providing a program language having a plurality of units of protection, each of the units of protection having an interface with at least one other unit of protection, and the program language having automatic storage reclamation, the operating system having control over protection domains and a communication mechanism; and forming a nucleus component which integrates hardware protection mechanisms and resource control provided by the operating system with semantic knowledge of a program represented by the language run time system.

In some embodiments of the method, the nucleus component is included in the kernel of the operating system; and/or the nucleus component handles management and protection of the units of protection; and/or the management and protection includes placing the units of protection into separate protection domains, and transparent sharing of data elements embedded in the protection units; and/or the management and protection includes transparent and controlled invocation of methods embedded in the units of protection, and automatic reclamation of data elements; and/or the invocation includes controlled transfer from one protection domain to another protection domain; and/or the invocation includes CPU resource control; and/or the invocation includes an optimized invocation mechanism; and/or the optimized invocation mechanism includes embedding of references to critical data structures in protected executable code to support the nucleus component in making control transfer decisions; and/or the protected executable code includes protection mechanisms to: protect the executable code from being tampered with; and/or at least a portion of the protection mechanisms is performed using hardware.

In particular embodiments, the method further comprises forming the storage reclamation by determining for each of the protection domains any data element not in use, on a per domain basis, making unavailable any data element not in use on a per domain basis and reclaiming storage space used by said any data element not in use in all of the protection domains; and/or forming the storage reclamation by transparent and secure sharing of data elements in use and references to the data elements-in-use between protection domains.

In some embodiments of the method, the transparent sharing of data elements includes relocation of data elements in use when the program represented by the language run time system is running; and/or the step of sharing only shares properly exported data elements-in-use; and/or properly exported data elements-in-use include data elements-in-use having an argument to a cross domain method invocation, an assignment by an owner of each data elements-in-use, and an assignment where the data elements can be traced back to a cross domain method invocation argument.

In some embodiments the method further comprises organizing memory associated with the operating system into a plurality of protection domains having a common virtual address space view; and/or the common virtual address view is a single address space visible to at least one of the protection domains.

The present invention also provides a computer apparatus comprising: an operating system with a language run time system, the operating system having control over protection domains and a communication mechanism; a program language having a plurality of units of protection, each of the units of protection having an interface with at least one other unit of protection, and the program language having automatic storage reclamation; and a nucleus component to integrate protection mechanisms and resource control provided by the operating system with semantic knowledge of a program represented by the language run time system.

In some embodiments of the apparatus, the nucleus component is included outside a kernel of the operating system; and/or the nucleus component handles management and protection of the units of protection; and/or the management and protection places the units of protection into separate protection domains; and performs transparent sharing of data elements embedded in the protection units; and/or the management and protection includes transparent and controlled invocation of methods embedded in the units of protection, and automatic reclamation of data elements; and/or the invocation includes controlled transfer from one protection domain to another protection domain; and/or the invocation includes CPU resource control; and/or the invocation includes an optimized invocation mechanism; and/or the optimized invocation mechanism includes means for embedding of references to critical data structures in protected executable code to support the nucleus component in making control transfer decisions; and/or the protected executable code includes protection mechanisms to protect the executable code from being tampered with.

In particular embodiments of the apparatus at least a portion of the protection mechanisms is performed using hardware; and/or the apparatus as recited in claim 21, further comprises a storage reclamation means for: determining for each of the protection domains any data element not in use, on a per domain basis, making unavailable said any data element not in use on a per domain basis, and reclaiming storage space used by said any data element not in use in all of the protection domains; and/or the storage reclamation means performs storage reclamation by transparent and secure sharing of data elements-in-use and references to the data elements-in-use between protection domains; and/or the transparent sharing of data elements includes relocation of data elements in use when the program represented by the language run time system is running; and/or the storage reclamation means only shares properly exported data elements-in-use; and/or properly exported data elements-in-use include data elements-in-use having: an argument to a cross domain method invocation, an assignment by an owner of each data elements-in-use, and an assignment where the data elements can be traced back to a cross domain method invocation argument.

In some embodiments the apparatus further includes memory associated with the operating system. The memory being organized into a plurality of protection domains having a common virtual address space view, sometimes the common virtual address view is a single address space visible to at least one of the protection domains.

Other embodiments of the invention include a computer usable medium having computer readable program code means embodied therein for causing integration of an operating system with a language run time system. The computer readable program code means in the computer program product comprises computer readable program code means for causing a computer to effect: providing a program language having a plurality of units of protection, each of the units of protection having an interface with at least one other unit of protection, and the program language having automatic storage reclamation, the operating system having control over protection domains and a communication mechanism; and forming a nucleus component which integrates hardware protection mechanisms and resource control provided by the operating system with semantic knowledge of a program represented by the language run time system.

It is noted that the foregoing has outlined some aspects and embodiments of the present invention. This invention may be used for many applications and languages. Thus, although the description is made for particular arrangements and methods, the intent and concept of the invention is suitable and applicable to other arrangements and applications. Thus, it will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for integrating an operating system with a language run time system, the method comprising:

providing a program language having a plurality of units of protection, each of the units of protection having an interface with at least one other unit of protection, and the program language having automatic storage reclamation, the operating system having control over protection domains and a communication mechanism; and forming a nucleus component which integrates hardware protection mechanisms and resource control provided by the operating system with semantic knowledge of a program represented by the language run time system.

2. A method as recited in claim 1, wherein the nucleus component is included in the kernel of the operating system.

3. A method as recited in claim 1, wherein the nucleus component handles management and protection of the units of protection.

4. A method as recited in claim 3, wherein the management and protection includes:

placing the units of protection into separate protection domains; and transparent sharing of data elements embedded in the protection units.

5. A method as recited in claim 4, wherein the management and protection includes:

transparent and controlled invocation of methods embedded in the units of protection; and automatic reclamation of data elements.

6. A method as recited in claim 5, wherein the invocation includes controlled transfer from one protection domain to another protection domain.

7. A method as recited in claim 6, wherein the invocation includes CPU resource control.

8. A method as recited in claim 6, wherein the invocation includes an optimized invocation mechanism.

9. A method as recited in claim 8, where the optimized invocation mechanism includes embedding of references to critical data structures in protected executable code to support the nucleus component in making control transfer decisions.

10. A method as recited in claim 9, wherein the protected executable code includes protection mechanisms to protect the executable code from being tampered with.

11. A method as recited in claim 1, wherein at least a portion of the protection mechanisms is performed using hardware.

12. A method as recited in claim 1, further comprising forming the storage reclamation by:
   determining for each of the protection domains any data element not in use;
   on a per domain basis, making unavailable said any data element not in use; and
   reclaiming storage space used by said any data element not in use in all of the protection domains.

13. A method as recited in claim 12, further comprising forming the storage reclamation by transparent and secure sharing of data elements in use and references to the data elements-in-use between protection domains.

14. A method as recited in claim 13, wherein the transparent sharing of data elements includes relocation of data elements in use when the program represented by the language run time system is running.

15. A method as recited in claim 14, wherein properly exported data elements-in-use include data elements-in-use having:
   an argument to a cross domain method invocation, an assignment by an owner of each data elements-in-use, and
   an assignment where the data elements can be traced back to a cross domain method invocation argument.

16. A method as recited in claim 13, wherein the step of sharing only shares properly exported data elements-in-use.

17. A method as recited in claim 1, further comprising organizing memory associated with the operating system into a plurality of protection domains having a common virtual address space view.

18. A method as recited in claim 17, wherein the common virtual address view is a single address space visible to at least one of the protection domains.

19. A method as recited in claim 1, wherein the program is written in the JAVA language.

20. A method as recited in claim 1, wherein the program is written in the Smalltalk language.

21. A computer apparatus comprising:
   an operating system with a language run time system, the operating system having control over protection domains and a communication mechanism;
   a program language having a plurality of units of protection, each of the units of protection having an interface with at least one other unit of protection, and said program language having automatic storage reclamation; and
   a nucleus component to integrate protection mechanisms and resource control provided by the operating system with semantic knowledge of a program represented by the language run time system.

22. An apparatus as recited in claim 21, wherein the nucleus component is included outside a kernel of the operating system.

23. An apparatus as recited in claim 21, wherein the nucleus component handles management and protection of the units of protection.

24. An apparatus as recited in claim 23, wherein the management and protection places the units of protection into separate protection domains; and performs transparent sharing of data elements embedded in the protection units.

25. An apparatus as recited in claim 24, wherein the management and protection includes transparent and controlled invocation of methods embedded in the units of protection, and automatic reclamation of data elements.

26. An apparatus as recited in claim 25, wherein the invocation includes controlled transfer from one protection domain to another protection domain.

27. An apparatus as recited in claim 26, wherein the invocation includes CPU resource control.

28. An apparatus as recited in claim 26, wherein the invocation includes an optimized invocation mechanism.

29. An apparatus as recited in claim 28, where the optimized invocation mechanism includes means for embedding of references to critical data structures in protected executable code to support the nucleus component in making control transfer decisions.

30. An apparatus as recited in claim 29, wherein the protected executable code includes protection mechanisms to protect the executable code from being tampered with.

31. An apparatus as recited in claim 21, wherein at least a portion of the protection mechanisms is performed using hardware.

32. An apparatus as recited in claim 21, further comprises a storage reclamation means for:
   determining for each of the protection domains any data element not in use;
   on a per domain basis, making unavailable said any data element not in use; and
   reclaiming storage space used by said any data element not in use in all of the protection domains.

33. An apparatus as recited in claim 32, wherein the storage reclamation means performs storage reclamation by transparent and secure sharing of data elements-in-use and references to the data elements-in-use between protection domains.

34. An apparatus as recited in claim 33, wherein the transparent sharing of data elements includes relocation of data elements in use when the program represented by the language run time system is running.

35. An apparatus as recited in claim 33, wherein the storage reclamation means only shares properly exported data elements-in-use.

36. An apparatus as recited in claim 34, wherein properly exported data elements-in-use include data elements-in-use having:
   an argument to a cross domain method invocation,
   an assignment by an owner of each data elements-in-use, and
   an assignment where the data elements can be traced back to a cross domain method invocation argument.

37. An apparatus as recited in claim 21, further comprising memory associated with the operating system, the memory being organized into a plurality of protection domains having a common virtual address space view.

38. An apparatus as recited in claim 37, wherein the common virtual address view is a single address space visible to at least one of the protection domains.

39. An apparatus as recited in claim 21, wherein the program is written in ML.

40. An apparatus as recited in claim 21, wherein the program is written using the Self language.

41. An article of manufacture comprising a computer usable medium having computer readable program code means embodied therein for causing integration of an operating system with a language run time system, the computer readable program code means in said article of manufacture comprising computer readable program code means for causing a computer to effect:

provides a program language having a plurality of units of protection, each of the units of protection having an interface with at least one other unit of protection, and said program language having automatic storage reclamation, the operating system having control over protection domains and a communication mechanism; and forming a nucleus component which integrates hardware protection mechanisms and resource control provided by the operating system with semantic knowledge of a program represented by the language run time system.

42. An article of manufacture as recited in claim 41, wherein the nucleus component is included in the kernel of the operating system.

43. An article of manufacture as recited in claim 41, wherein the nucleus component handles management and protection of the units of protection.

44. An article of manufacture as recited in claim 43, wherein the management and protection includes:

placement of the units of protection into separate protection domains; and transparent sharing of data elements embedded in the protection units.

45. An article of manufacture as recited in claim 41, A method as recited in claim 4, wherein the management and protection includes:

transparent and controlled invocation of methods embedded in the units of protection, and automatic reclamation of data elements.

46. An article of manufacture as recited in claim 45, wherein the invocation includes controlled transfer from one protection domain to another protection domain.

47. An article of manufacture as recited in claim 46, wherein the invocation includes CPU resource control.

48. An article of manufacture as recited in claim 46, wherein the invocation includes an optimized invocation mechanism.

49. An article of manufacture as recited in claim 48, wherein the optimized invocation mechanism includes embedding of references to critical data structures in protected executable code to support the nucleus component in making control transfer decisions.

50. An article of manufacture as recited in claim 49, wherein the protected executable code includes protection mechanisms to protect the executable code from being tampered with.

51. An article of manufacture as recited in claim 41, wherein at least a portion of the protection mechanisms is performed using hardware.

52. An article of manufacture as recited in claim 41, the computer readable program code means in said article of manufacture further comprising computer readable program code means for causing a computer to effect forming the storage reclamation by:

determining for each of the protection domains any data element not in use;

on a per domain basis, making unavailable said any data element not in use; and reclaiming storage space used by said any data element not in use in all of the protection domains.

53. An article of manufacture as recited in claim 52, the computer readable program code means in said article of manufacture further comprising computer readable program code means for causing a computer to effect forming the storage reclamation by transparent and secure sharing of data elements-in-use and references to the data elements-in-use between protection domains.

54. An article of manufacture as recited in claim 53, wherein the transparent sharing of data elements includes relocation of data elements in use when the program represented by the language run time system is running.

55. An article of manufacture as recited in claim 54, wherein properly exported data elements-in-use include data elements-in-use having:

an argument to a cross domain method invocation, an assignment by an owner of each data elements-in-use, and an assignment where the data elements can be traced back to a cross domain method invocation argument.

56. An article of manufacture as recited in claim 53, wherein the step of sharing only shares properly exported data elements-in-use.

57. An article of manufacture as recited in claim 41, the computer readable program code means in said article of manufacture further comprising computer readable program code means for causing a computer to effect organizing memory associated with the operating system into a plurality of protection domains having a common virtual address space view.

58. An article of manufacture as recited in claim 57, wherein the common virtual address view is a single address space visible to at least one of the protection domains.

59. An article of manufacture as recited in claim 41, wherein the program is written in MODULA3.

* * * * *